US012689451B2

(12) United States Patent
Jones

(10) Patent No.: US 12,689,451 B2
(45) Date of Patent: Jul. 21, 2026

(54) CALIBRATION OF A PHASE SHIFT MATRIX FOR CABLE-CONNECTED TESTING OF A MASSIVE MULTIPLE-INPUT MULTIPLE-OUTPUT BASE STATION

(71) Applicant: VIAVI Solutions Inc., Chandler, AZ (US)

(72) Inventor: Adrian Jones, Letchworth (GB)

(73) Assignee: VIAVI Solutions Inc., Chandler, AZ (US)

( * ) Notice: Subject to any disclaimer, the term of this patent is extended or adjusted under 35 U.S.C. 154(b) by 374 days.

(21) Appl. No.: 18/416,735

(22) Filed: Jan. 18, 2024

(65) Prior Publication Data

US 2025/0240103 A1 Jul. 24, 2025

(51) Int. Cl.
H04B 17/12 (2015.01)
H04B 17/21 (2015.01)

(52) U.S. Cl.
CPC ........... H04B 17/12 (2015.01); H04B 17/221 (2023.05)

(58) Field of Classification Search
CPC ...... H04B 17/12; H04B 17/221; H04B 17/17; H01Q 3/267
See application file for complete search history.

(56) References Cited

U.S. PATENT DOCUMENTS 10,313,034 B2    6/2019    Rodriguez-Herrera et al.
10,587,350 B2    3/2020    Rodriguez-Herrera et al.

| 12,348,304 | B2 * | 7/2025 | Kaplan | H04K 3/42 |
| 12,375,188 | B2 * | 7/2025 | Deckert | H04B 17/0085 |
| 12,394,893 | B2 * | 8/2025 | Aoki | H01Q 3/267 |
| 12,395,251 | B1 * | 8/2025 | Coutts | H04B 7/0617 |

OTHER PUBLICATIONS

H.M. Aumann, et al.; "Phased-Array Calibration By Adaptive Nulling"; Technical Report 915; May 20, 1991; 25 pages; https://apps.dtic.mil/sti/pdfs/ADA238562.pdf.
Extended European Search Report for European Application No. 25150480.9 dated Jun. 2, 2025, 6 pages.

* cited by examiner

*Primary Examiner* — Marcus Smith
*Assistant Examiner* — Francesca Lima Santos
(74) *Attorney, Agent, or Firm* — Harrity & Harrity, LLP

(57) ABSTRACT

A testing device may receive, from a phase shift matrix (PSM), a signal pattern associated with a plurality of antenna ports of a base station. The testing device may obtain data associated with the signal pattern and may identify, based on the data, a plurality of null directions associated with the signal pattern. The testing device may, for each null direction of the plurality of null directions: identify, based on the data, a measured amplitude associated with the null direction; determine, based on the measured amplitude, an estimated phase associated with the null direction; and determine, based on the measured amplitude and the estimated phase, an estimated in-phase amplitude associated with the null direction. The testing device may thereby determine error correction information associated with the plurality of null directions. The testing device may provide the error correction information, such as to enable calibration of the PSM.

20 Claims, 6 Drawing Sheets

100

200

Base Station 210

PSM 220

Testing Device 230

CALIBRATION OF A PHASE SHIFT MATRIX FOR CABLE-CONNECTED TESTING OF A MASSIVE MULTIPLE-INPUT MULTIPLE-OUTPUT BASE STATION

BACKGROUND

A base station may utilize a massive multiple-input multiple-output (M-MIMO) antenna system to support multiple data streams at the same time. A M-MIMO antenna system may enable a base station to employ different beamforming strategies.

SUMMARY

In some implementations, a method includes receiving, by a testing device and from a phase shift matrix (PSM), a signal pattern associated with a plurality of antenna ports of a base station; obtaining, by the testing device, data associated with the signal pattern; identifying, by the testing device and based on the data, a plurality of null directions associated with the signal pattern; for each null direction of the plurality of null directions: identifying, by the testing device and based on the data, a measured amplitude associated with the null direction, determining, by the testing device and based on the measured amplitude, an estimated phase associated with the null direction, and determining, based on the measured amplitude and the estimated phase, an estimated in-phase amplitude associated with the null direction; determining, by the testing device and based on the estimated in-phase amplitude associated with each null direction of the plurality of null directions, error information associated with the plurality of null directions; determining, based on the error information, error correction information; and providing the error correction information.

In some implementations, a testing device includes one or more memories; and one or more processors, coupled to the one or more memories, configured to: obtain data associated with a signal pattern of a plurality of antenna ports of a base station; identify, based on the data, a plurality of null directions associated with the signal pattern; for each null direction of the plurality of null directions: determine, based on a measured amplitude associated with the null direction, an estimated phase associated with the null direction, and determine, based on the measured amplitude and the estimated phase, an estimated in-phase amplitude associated with the null direction; determine, based on the estimated in-phase amplitude associated with each null direction of the plurality of null directions, error correction information associated with the plurality of null directions; and provide the error correction information.

In some implementations, a non-transitory computer-readable medium storing a set of instructions includes one or more instructions that, when executed by one or more processors of a testing device, cause the testing device to: identify, based on data associated with a signal pattern of a plurality of antenna ports of a base station, a plurality of null directions associated with the signal pattern; determine, based on the data, estimated in-phase amplitudes respectively associated with the plurality of null directions; determine, based on the estimated in-phase amplitudes respectively associated with the plurality of null directions, error correction information associated with the plurality of antenna ports of the base station; and provide the error correction information.

DETAILED DESCRIPTION

Figure 1A:
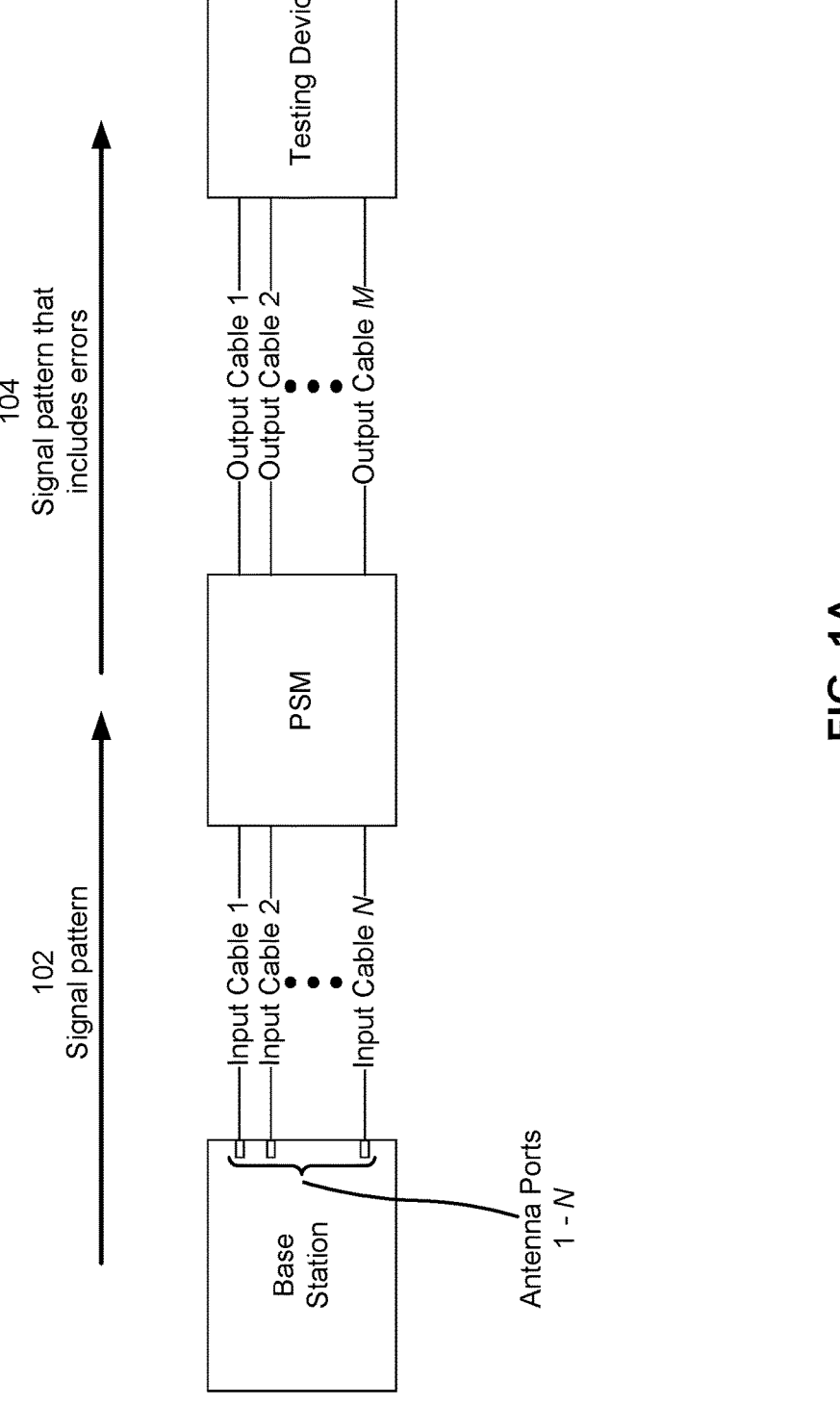
FIGS. 1A-1C are diagrams of an example implementation associated with calibration of a phase shift matrix (PSM) for cable-connected testing of a massive multiple-input multiple-output (M-MIMO) base station.

The following detailed description of example implementations refers to the accompanying drawings. The same reference numbers in different drawings may identify the same or similar elements.

A phase shift matrix (PSM) and a testing device can be used in a testing system to test, analyze, and/or troubleshoot a base station, such as a massive multiple-input multiple-output (M-MIMO) base station. The base station can simultaneously transmit multiple beams (e.g., downlink beams) to, and/or multiple beams (e.g., uplink beams) from, multiple beam directions (e.g., at the same time). The PSM is configured to separate the multiple beam directions of the multiple downlink beams transmitted by the base station (e.g., at output ports of the PSM) and also to provide multiple uplink beams (e.g., that originate from the testing device) to the base station. That is, the PSM is designed to be reciprocal, to mimic the behavior of a real channel and allow testing of closed loop beam selection algorithms. Accordingly, optimizing downlink typically results in improved uplink errors.

The PSM and the testing device can be configured to test and/or analyze the base station to determine whether the multiple beam directions work simultaneously, such that the multiple beams do not interfere with each other. Any error (further described herein) introduced in association with testing and/or analyzing the base station can cause mutual interference between beams, which can limit a total throughput of the testing system.

To test and/or analyze the base station, input ports of the PSM are connected to antenna ports of the base station (e.g., with antennas of the base station removed from the antenna ports) via a plurality of input cables (e.g., a plurality of radio frequency (RF) input cables), and output ports of the PSM are connected to testing ports of the testing device via a plurality of output cables (e.g., a plurality of RF output cables).

The base station then provides a signal pattern, by emitting a plurality of signals, which is received by the PSM. The PSM combines signals and/or applies weightings to the plurality of signals (e.g., to emulate spatial aspects of the signals) and provides the signal pattern to the testing device. However, errors, such as amplitude and phase errors that are associated with a plurality of null directions of the signal pattern, are often introduced to the signal pattern as the signal pattern propagates from the base station and to the PSM and the testing device (e.g., due to attenuation errors, cable length mismatch errors, uncompensated base station errors, and/or other errors). This can affect an ability of the PSM and the testing device to accurately test, analyze, and/or troubleshoot the base station.

Additional equipment can be used to identify and/or correct errors associated with the signal pattern. However, this is often a time consuming and complex process that requires manual intervention by a technician (e.g., that is tasked with using the PSM and the testing device to test, analyze, and/or troubleshoot the base station). Further, in many cases, the additional equipment is not able to accurately identify errors, or provide sufficient information that allows the PSM to be calibrated to fully offset the errors. That is, even when using the additional equipment to facilitate initial calibration of the PSM, the signal pattern often still includes errors that impact the performance of the PSM and the testing device.

Some implementations described herein include a testing device associated with a PSM and a base station (e.g., the testing device may be cable-connected with the PSM and the base station). The testing device receives a signal pattern associated with a plurality of antenna ports of the base station and identifies a plurality of null directions associated with the signal pattern. For each null direction, the testing device identifies a measured amplitude associated with the null direction (e.g., based on data associated with the signal pattern), determines an estimated phase associated with the null direction (e.g., using a phase sweeping technique or a phase sampling technique, described herein), and determines an estimated in-phase amplitude associated with null direction. The testing device thereby determines error information associated with the plurality of null directions, which the testing device uses to determine error correction information. The testing device then provides the error correction information, which can be used to calibrate the PSM. For example, the PSM may adjust one or more settings of the PSM to offset (or to minimize) error (e.g., residual error) included in the signal pattern. This enables the PSM and testing device to provide an improved performance, such as with respect to testing, analyzing, and/or troubleshooting a base station (e.g., by improving a likelihood that the PSM and the testing device provide accurate results).

In this way, the testing device determines error correction information (e.g., that can be used to calibrate the PSM) without the use of additional equipment (or manual intervention by a technician). Further, the testing device uses a novel process to determine estimated phases associated with the plurality of null directions based only on measured amplitudes associated with the plurality of null directions (e.g., without any measured phase information). Accordingly, the testing device does not need to be configured to, or include additional components to, measure or determine phases associated with the plurality of null directions. This thereby reduces a complexity of the testing device, and also enables the testing device to provide an additional functionality that the testing device may not have been originally intended to provide.

Figure 1B:
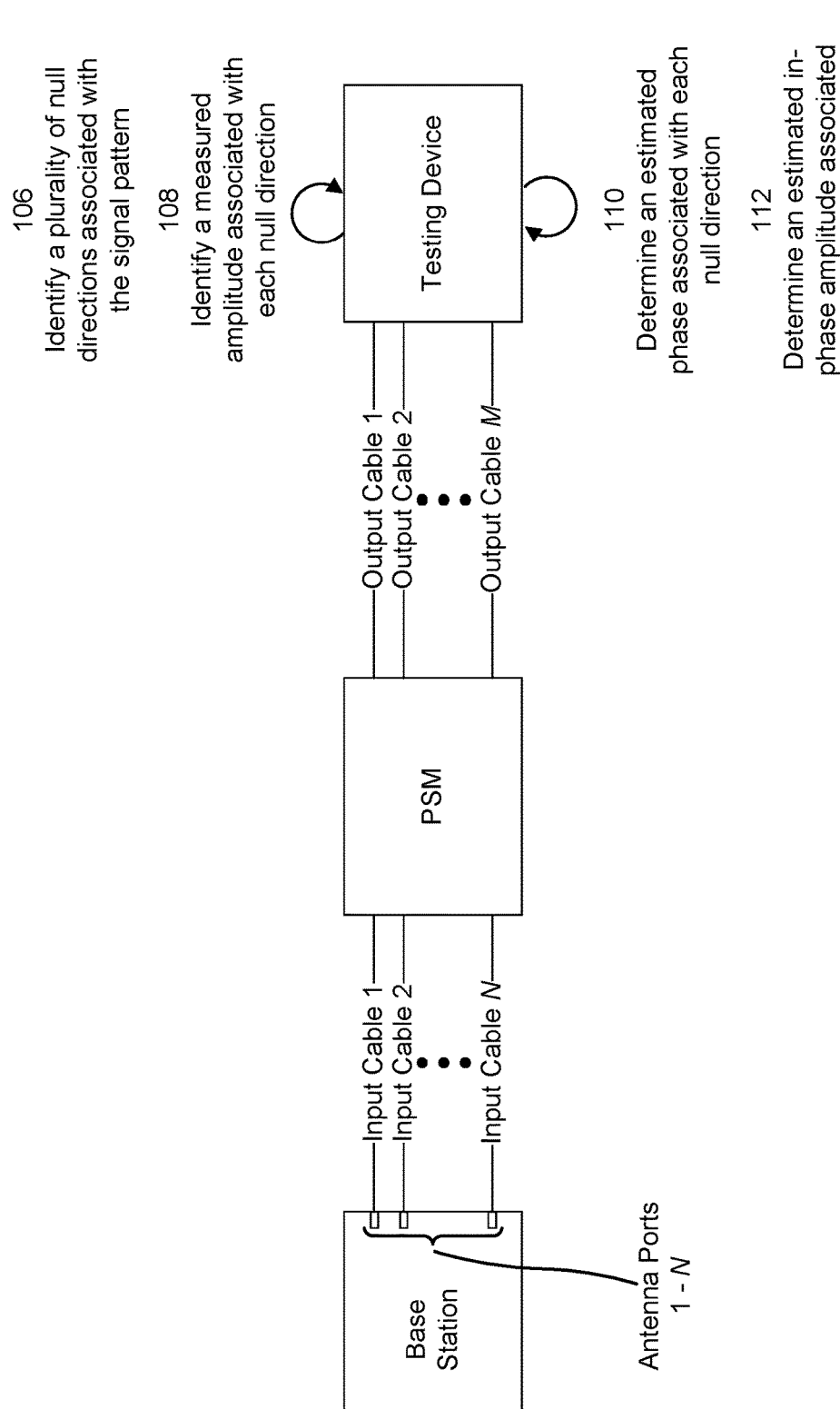
Figure 1C:
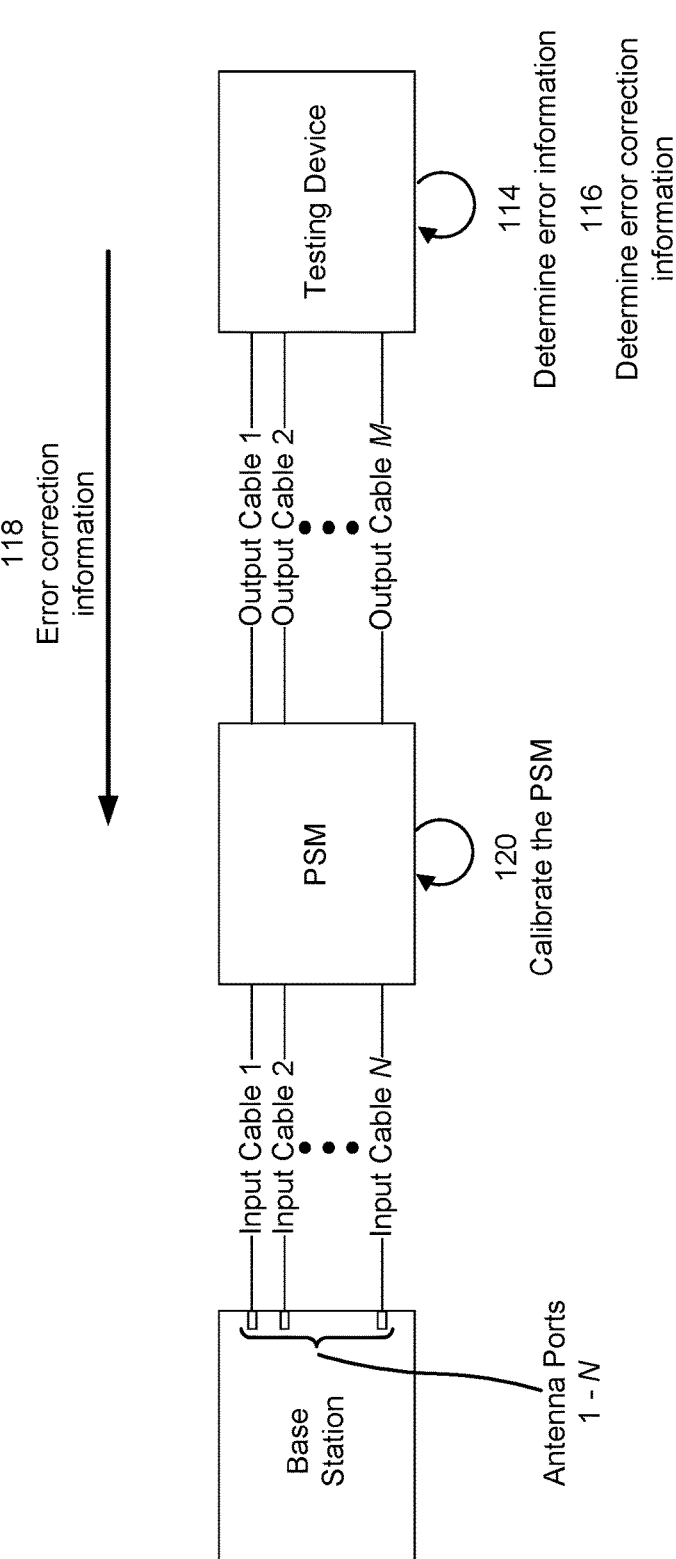

FIGS. 1A-1C are diagrams of an example implementation 100 associated with calibration of a PSM for cable-connected testing of a M-MIMO base station. As shown in FIGS. 1A-1C, example implementation 100 includes a base station, a PSM, and a testing device. These devices are described in more detail below in connection with FIG. 2 and FIG. 3.

The base station may be a node of a radio access network of a mobile network (e.g., a cellular network). For example, the base station may facilitate communication between a user equipment (UE) and the mobile network, another data network, another UE, and/or the like. In an operating scenario, the base station may include an antenna array and one or more computing devices (e.g., server devices) to facilitate communication with a UE. In some implementations, the base station may be enabled for multiple-input multiple-output (MIMO) communication and/or M-MIMO communication. That is, the base station may be capable of transmitting a wireless signal using the antenna array.

The base station may include a plurality of antenna ports, to which a plurality of antennas are connected (e.g., in the operating scenario) to form the antenna array. For example, as shown in FIGS. 1A-1C, the base station may include N antenna ports (where N>2), and therefore the base station may include N antennas (e.g., when connected to the plurality of antenna ports, such as in the operating scenario). In some implementations, the plurality of antenna ports (and therefore the plurality of antennas, when connected to the plurality of antenna ports) may be arranged in a two-dimensional pattern (e.g., a two-dimensional array, or another type of two-dimensional pattern). For example, the plurality of antenna ports may be arranged in an A×B array (e.g., where A multiplied by B is N).

The PSM may include a plurality of input ports (also referred to as antenna ports, but are referred to herein as input ports to avoid confusion with the antenna ports of the base station). For example, the PSM may include N input ports (e.g., a same number of input ports as the number of antenna ports of the base station). The PSM may be connected to the base station by a plurality of input cables (e.g., a plurality of input RF cables), such as to allow the PSM and the testing device to perform testing, analysis, troubleshooting, and/or other similar functions, of the base station. For example, as shown in FIGS. 1A-1C, N input cables may connect the base station to the PSM, such that an antenna port, of the N antenna ports of the base station, is connected to a corresponding input port, of the N input ports of the PSM, via a particular input cable of the N input cables.

Additionally, the PSM may include a plurality of output ports (also referred to as beam ports). For example, the PSM may include M output ports (where M>2 and is the same as, or, alternatively, different than, N). The PSM may be connected to testing device by a plurality of output cables (e.g., a plurality of output RF cables), such as to allow the PSM and the testing device to perform testing, analysis, troubleshooting, and/or other similar functions, of the base station. For example, as shown in FIGS. 1A-1C, M output cables may connect the PSM to the testing device. Accordingly, the testing device may include M testing ports, and the M output cables may connect the PSM to the testing device such that an output port, of the M output ports of the PSM, is connected to a corresponding testing port, of the M testing ports of the testing device, via a particular output cable of the of the M output cables.

The PSM may be configured to emulate spatial aspects of signals transmitted by the base station (e.g., via the plurality of input cables). The PSM may be, or may include, at least one of a variable PSM, a fixed PSM (e.g., that includes a Butler matrix), an analog PSM (e.g., that is configured to handle signals at RF frequencies and/or intermediate frequency (IF) frequencies), a digital PSM (e.g., that is configured to handle signals at baseband frequencies), and/or another type of PSM.

The PSM may be configured to combine signals (e.g., received by the PSM from the base station), apply weightings to the signals, and provide the signals to the testing device (e.g., via the plurality of output cables), such as to allow the testing device to analyze the signals. In some implementations, errors (e.g., attenuation errors, cable length mismatch errors, uncompensated base station errors, and/or other errors) may be introduced into signals between the base station and the PSM. Accordingly, the PSM may be calibrated, based on operations described herein in relation to FIGS. 1A-1C, to offset (or to minimize) the errors within the PSM (e.g., to facilitate more accurate testing of the base station by the PSM and/or the testing device).

As shown in FIG. 1A, and by reference number 102, the base station may provide a signal pattern associated with the plurality of antenna ports of the base station. For example, the base station may generate a plurality of signals and provide the plurality of signals, in the signal pattern, via the plurality antenna ports. The plurality of signals, in the signal pattern, may thereby propagate to the PSM, such as by the plurality of input cables and the plurality of input ports of the PSM. Notably, the plurality of signals may accumulate errors when propagating from the base station. That is, when received by the PSM, the signal pattern may include errors (e.g., propagation errors). For example, the plurality of signals may include amplitude and phase errors that are associated with a plurality of null directions (e.g., a plurality of calculated, or predetermined, null directions) associated with the signal pattern. In some implementations, one or more settings of the PSM may be configured to address the errors of the signal pattern (e.g., as a result of an initial calibration of the PSM).

In some implementations, as shown by reference number 104, the PSM may provide the signal pattern to the testing device, such as after the PSM emulates spatial aspects associated with the signal pattern. The PSM may (still) include errors (e.g., the signal pattern may include residual errors that were not entirely addressed by configuration of the one or more settings of the PSM). In some implementations, the PSM may provide the plurality of signals (e.g., in the signal pattern, with errors) via the plurality of output ports of the PSM, and the plurality of signals may thereby propagate to the testing device, such as by the plurality of output cables and the plurality of testing ports of the testing device.

Accordingly, the testing device may receive the signal pattern (that includes errors). In some implementations, the testing device may analyze the signal pattern (e.g., using one or more signal processing techniques) to obtain data associated with the signal pattern. The data may indicate, for example, information associated with the plurality of signals (e.g., of the signal pattern), such as respective measured amplitudes of the plurality of signals. The data may include additional information, such as respective measured amplitudes associated with the plurality of null directions associated with the signal pattern. That is, the data may indicate measured amplitudes of one or more signals, of the plurality of signals in the signal pattern, that are present in each null direction of the plurality of null directions (e.g., due to the errors of the signal pattern).

As shown in FIG. 1B, and by reference number 106, the testing device may identify the plurality of null directions associated with the signal pattern. For example, the testing device may process the data to identify the plurality of null directions (e.g., to "predict" the plurality of null directions). As an alternative example, the testing device may be pre-programmed with the plurality of null directions, or may perform a lookup in data structure (e.g., a table, a file, or another type of data structure) to determine the plurality of null directions.

As shown by reference number 108, the testing device may identify a measured amplitude associated with each null direction (e.g., an absolute value of a measured amplitude associated with each null direction). For example, the testing device may process (e.g., parse, read, and/or analyze) the data associated with the signal pattern to identify a measured amplitude associated with a null direction.

The testing device may represent the measured amplitudes of the plurality of null directions as a vector. For example, $|\epsilon_{n_{init}}|$ may represent a vector that includes measured amplitudes (e.g., absolute values of the measured amplitudes) associated with the plurality of null directions (e.g., N null directions). Accordingly, in some implementations, $$|\epsilon_{n_{init}}| = \begin{bmatrix} |\epsilon_{n_{init(1)}}| \\ |\epsilon_{n_{init(2)}}| \\ \vdots \\ |\epsilon_{n_{init(N)}}| \end{bmatrix},$$

where $\epsilon_{n_{init(j)}}$ is a measured amplitude associated with a $j^{th}$ null direction of the plurality of null directions.

As shown by reference number 110, the testing device may determine an estimated phase associated with each null direction (e.g., based on the measured amplitude associated with the null direction). In some implementations, the testing device may determine estimated phases respectively associated with the plurality of null directions using a phase sweeping technique or a phase sampling technique.

For example, for a null direction, the testing device may identify a phase value (e.g., that indicates a "guessed" phase by the testing device) and may determine (e.g., based on the measured amplitude associated with the null direction and the phase value) a possible in-phase amplitude associated with the null direction. Accordingly, in some implementations, $$\epsilon_{n_{guess}(j)} = |\epsilon_{n\_init(j)}| e^{i\psi},$$

where $\epsilon_{n_{guess}(j)}$ is the possible in-phase amplitude associated with a $j^{th}$ null direction, $\epsilon_{n_{init(j)}}$ is the measured amplitude associated with the $j^{th}$ null direction, and $\psi$ is the phase value. Further, the testing device may include the possible in-phase amplitude associated with the $j^{th}$ null direction in a vector, $\delta_{n_{guess}}$. Accordingly, in some implementations, $$\epsilon_{n_{guess}} = \begin{bmatrix} 1 \\ 0 \\ \vdots \\ \epsilon_{n_{guess}(j)} \\ \vdots \\ 0 \end{bmatrix},$$

where a 1 is in a first position of the $\epsilon_{n_{guess}}$, vector, the possible in-phase amplitude associated with the $j^{th}$ null direction is in a $j^{th}$ position in the $\epsilon_{n_{guess}}$ vector, and a 0 is in every other position in the $\epsilon_{n_{guess}}$ vector.

The testing device then may determine possible error information (e.g., based on the possible in-phase amplitude associated with the null direction) associated with the null direction. For example, the testing device may use a back transforming technique, based on the possible in-phase amplitude associated with the null direction, to determine the possible error information. As a specific example, the testing device may multiply a complex gain factor, the $\epsilon_{n_{guess}}$ vector (e.g., that includes the possible in-phase amplitude associated with the null direction), and/or an inverse of a complex number matrix to obtain a product vector, and then may divide the product vector (e.g., by performing element-wise division) by an excitation vector associated with the plurality of antenna ports of the base station. The complex number matrix may define the transformation from the antenna port signals to the far-field signals in the null directions. It is calculated using prior knowledge of the expected null directions, using known relationships between the array antenna excitations and the far-field (known as "antenna factor").

In this way, the testing device may determine possible error information that results in the possible error vector, $e_{n_{guess}}$. Accordingly, in some implementations, $$e_{n_{guess}} = \begin{bmatrix} 1 \\ 0 \\ \vdots \\ e_{n_{guess}(j)} \\ \vdots \\ 0 \end{bmatrix},$$

where a 1 is in a first position of the $e_{n_{guess}}$ vector; $e_{n_{guess}(j)}$ is a possible error value associated with the $j^{th}$ null direction that is in a $j^{th}$ position in the $e_{n_{guess}}$ vector, and a 0 is in each every other position in the $e_{n_{guess}}$ vector.

The testing device then may determine possible error correction information (e.g., based on the possible error information) associated with the null direction. For example, the testing device may inverse the $e_{n_{guess}}$ vector to generate a $c_{n_{guess}}$ vector (e.g., where $c_{n_{guess}} = (e_{n_{guess}})^{-1}$). Accordingly, in some implementations, $$c_{n_{guess}} = \begin{bmatrix} 1 \\ 0 \\ \vdots \\ c_{n_{guess}(j)} \\ \vdots \\ 0 \end{bmatrix},$$

where a 1 is in a first position of the $c_{n_{guess}}$ vector; $c_{n_{guess}(j)}$ is a possible error correction value associated with the $j^{th}$ null direction (e.g., that is equal to $1/e_{n_{guess}(j)}$) that is in a $j^{th}$ position in the $c_{n_{guess}}$ vector, and a 0 is in each every other position in the $c_{n_{guess}}$ vector.

The testing device may provide the possible error correction information (e.g., that includes the $c_{n_{guess}}$ vector). In some implementations, the testing device may provide the possible error correction information to the PSM. For example, the testing device may send the possible error correction information to the PSM via at least one of the plurality of output cables, or via a different connection (e.g., a different cable, or another wired or wireless communication link) between the testing device and the PSM. Accordingly, the PSM may use the possible error correction information to adjust the one or more settings of the PSM, such as to address the possible error value associated with the null direction (e.g., the $e_{n_{guess}(j)}$ possible error value associated with the $j^{th}$ null direction) of the plurality of null directions. For example, the PSM may process (e.g., parse, read, and/or analyze) the possible error correction information to identify possible error correction value associated with the null direction (e.g., the $c_{n_{guess}(j)}$ error correction value associated with the $j^{th}$ null direction that is in the $c_{n_{guess}}$ vector). The PSM may therefore adjust the one or more settings of the PSM based on the possible error correction value to address the possible error value (e.g., based on the $c_{n_{guess}(j)}$ error correction value to address the $e_{n_{guess}(j)}$ possible error).

Alternatively, in some implementations, the testing device may provide the possible error correction information to the base station. For example, the testing device may send the possible error correction information to the base station via at least one of the plurality of output cables and at least one of the input cables, or via a different connection (e.g., a different cable, or another wired or wireless communication link) between the testing device and the base station. Accordingly, the base station may use the possible error correction information to adjust one or more settings of the base station, such as to address the possible error value associated with the null direction (e.g., the $e_{n_{guess}(j)}$ possible error value associated with the $j^{th}$ null direction) of the plurality of null directions (e.g., in a similar manner as that described above for the PSM).

As another alternative, in some implementations, the testing device may provide the possible error correction information to one or more control blocks (e.g., phase and/or amplitude control blocks, which may be positioned between the base station and PSM). For example, the testing device may send the possible error correction information to the one or more control blocks via at least one of the plurality of output cables and at least one of the plurality of input cables, or via a different connection (e.g., a different cable, or another wired or wireless communication link) between the testing device and the one or more control blocks. Accordingly, the one or more control blocks may use the possible error correction information to adjust one or more settings of the one or more control blocks, such as to address the possible error value associated with the null direction (e.g., the $e_{n_{guess}(j)}$ possible error value associated with the $j^{th}$ null direction) of the plurality of null directions (e.g., in a similar manner as that described above for the PSM.

After adjustment of the PSM, the base station, or the one or more control blocks, the PSM may provide another signal pattern (e.g., associated with the plurality of signals provided by the base station), such as in a similar manner as that described herein in relation to FIG. 1A and reference number 104. The other signal pattern may be different from the initial signal pattern provided by the PSM (e.g., due to adjustment of the PSM, the basestation, or the one or more control blocks). Accordingly, the testing device may receive the other signal pattern. In some implementations, the testing device may analyze the other signal pattern (e.g., using one or more signal processing techniques) to obtain other data associated with the other signal pattern. The other data may indicate, for example, information associated with the plurality of signals (e.g., of the other signal pattern), such as respective measured amplitudes of the plurality of signals (e.g., in the other signal pattern). That is, the other data may indicate measured amplitudes of one or more signals, of the plurality of signals in the other signal pattern, that are present in null direction (e.g., the $j^{th}$ null direction) of the plurality of null directions.

The testing device then may identify another measured amplitude associated with the null direction (e.g., an absolute value of a measured amplitude associated with the $j^{th}$ null direction). For example, the testing device may process (e.g., parse, read, and/or analyze) the other data associated with the signal pattern to identify the measured amplitude associated with the null direction (e.g., the j null direction).

In a phase sweeping technique, the testing device may perform one or more of the operations described above in relation to reference number 110 multiple times (e.g., identify a guessed phase value for the null direction, determine a possible in-phase amplitude associated with the null direction, determine possible error information associated with the null direction, determine possible error correction information associated with the null direction, provide the possible error correction information, and/or identify another measured amplitude associated with the null direction) until the testing device identifies a minimum measured amplitude associated with the null direction. For example, the testing device may perform one or more of the operations four or more times to identify the minimum measured amplitude.

The minimum measured amplitude is likely associated with an actual phase of the null direction (e.g., because the possible error correction information associated with the minimum measured amplitude offset (or mostly offset) error associated with the null direction). Accordingly, the testing device may determine the estimate phase associated with the null direction to be the phase value (e.g., the guessed phase associated with the phase value) that is associated with the minimum measured amplitude.

In a phase sampling technique, the testing device may perform one or more of the operations described above in relation to reference number 110 three times (as compared to four or more times for the phase sweeping technique). For example, the testing device may identify a first phase value (e.g., for a first guessed phase of 0) for the null direction; determine a first possible in-phase amplitude associated with the null direction (e.g., based on the measured amplitude associated with the null direction, determined as in described herein in relation to reference number 108, and the first phase value); determine first possible error information associated with the null direction (e.g., based on the first possible in-phase amplitude); determine first possible error correction information associated with the null direction (e.g., based on the first possible error information), provide the first possible error correction information, and/or identify a first other measured amplitude associated with the null direction (e.g., based on providing the first possible error correction information). Further, the testing device may identify a second phase value (e.g., for a second guessed phase of $\pi/2$) for the null direction; determine a second possible in-phase amplitude associated with the null direction (e.g., based on the measured amplitude associated with the null direction, determined as in described herein in relation to reference number 108, and the second phase value); determine second possible error information associated with the null direction (e.g., based on the second possible in-phase amplitude); and determine second possible error correction information associated with the null direction (e.g., based on the second possible error information), provide the second possible error correction information, and/or identify a second other measured amplitude associated with the null direction (e.g., based on providing the second possible error correction information). Additionally, the testing device may identify a third phase value (e.g., for a third guessed phase of $-\pi/2$) for the null direction; determine a third possible in-phase amplitude associated with the null direction (e.g., based on the measured amplitude associated with the null direction, determined as in described herein in relation to reference number 108, and the third phase value); determine third possible error information associated with the null direction (e.g., based on the third possible in-phase amplitude); and determine third possible error correction information associated with the null direction (e.g., based on the third possible error information), provide the third possible error correction information, and/or identify a third other measured amplitude associated with the null direction (e.g., based on providing the third possible error correction information).

Accordingly, the testing device may process the first other measured amplitude, the second other measured amplitude, and the third other measured amplitude to determine the estimated phase associated with the null direction. For example, the testing device may process the first other measured amplitude, the second other measured amplitude, and the third other measured amplitude to determine the estimated phase associated with the null direction according to a formula:

$$\psi = \text{atan2}(k2-b, k1-b) - \pi$$

where $\psi$ is the estimated phase, atan2 is a four quadrant arctangent function, k1 is the first other measured amplitude, k2 is the second other measured amplitude, k3 is the third other measured amplitude, and $$b = (k2+k3)/2.$$

In some implementations, to avoid issues due a quantization step size of the PSM (e.g., a too large quantization step size of the PSM may limit accuracy of the estimated phase), a dithering technique may be used. For example, in relation to the phase sweeping and phase sampling techniques described above, the testing device may include dither (e.g., a uniformly distributed dither, such as with a level equal to the quantization step size of the PSM) to a guessed phase value for a null direction and/or a possible in-phase amplitude associated with the null direction. The testing device may repeatedly include dither (e.g., to the guessed phase value for the null direction and the possible in-phase amplitude associated with the null direction) several times (e.g., N times). Accordingly, the testing device may repeatedly determine possible error information associated with the null direction, determine possible error correction information, and identify another measured amplitude associated with the null direction (e.g., N times). The testing device then may average multiple other measured amplitudes to identify an averaged other measured amplitude associated with the null direction (e.g., divide a sum of the other measured amplitudes by N).

Accordingly, the testing device may determine the estimated phase associated with the null direction based on the averaged other measured amplitudes associated with the null direction (e.g., in a similar manner as that described above). For example, the testing device may process a first averaged other measured amplitude, a second other averaged measured amplitude, and a third averaged other measured amplitude to determine the estimated phase associated with the null direction according to a formula:

$$\psi = \text{atan } 2(k2-b, k1-b) - \pi,$$

where $\psi$ is the estimated phase, atan2 is a four quadrant arctangent function, k1 is the first averaged other measured amplitude, k2 is the second averaged other measured amplitude, k3 is the third averaged other measured amplitude, and $$b = (k2+k3)/2.$$

As shown by reference number 112, the testing device may determine an estimated in-phase amplitude associated with each null direction. Accordingly, in some implementations, $$\epsilon_{n_{estimated}(j)} = |\epsilon_{n\_init(j)}| e^{i\psi j},$$

is the estimated in-phase amplitude associated with a $j^{th}$ null direction, $\epsilon_{n_{init(j)}}$ is the measured amplitude associated with the $j^{th}$ null direction, and $\psi_j$ is the estimated phase associated with the $j^{th}$ null direction. Further, the testing device may include the estimated in-phase amplitude associated with the $j^{th}$ null direction in a vector, $\epsilon_{n_{estimated}}$. Accordingly, in some implementations, $$\epsilon_{n_{estimated}} = \begin{bmatrix} 1 \\ \vdots \\ \epsilon_{n_{estimated}(j)} \\ \vdots \\ \epsilon_{n_{estimated}(N)} \end{bmatrix},$$

where a 1 is in a first position of the $\epsilon_{n_{estimated}}$ vector, and the estimated in-phase amplitude associated with each $j^{th}$ null direction is in a corresponding $j^{th}$ position in the $\epsilon_{n_{estimated}}$ vector.

As shown in FIG. 1C, and by reference number 114, the testing device then may determine error information associated with the plurality of null directions (e.g., based on the estimated in-phase amplitudes associated with the plurality of null directions). For example, the testing device may use the back transforming technique (e.g., described herein), based on the estimated in-phase amplitude associated with each null direction, of the plurality of null directions, to determine the possible error information. As a specific example, the testing device may multiply a complex gain factor, the $\epsilon_{n_{estimated}}$ vector (e.g., that includes the estimated in-phase amplitudes associated with the plurality of null directions), and/or an inverse of a complex number matrix (e.g., as described above) to obtain a product vector, and then may divide the product vector (e.g., by performing element-wise division) by an excitation vector associated with the plurality of antenna ports of the base station. In this way, the testing device may determine possible error information that includes an estimated error vector, $\epsilon_{n_{estimated}}$. Accordingly, in some implementations, $$e_{n_{estimated}} = \begin{bmatrix} 1 \\ \vdots \\ e_{n_{estimated}(j)} \\ \vdots \\ e_{n_{estimated}(N)} \end{bmatrix},$$

where a 1 is in a first position of the $e_{n_{estimated}}$ vector; and $e_{n_{estimated}(j)}$ is an estimated error value associated with the $j^{th}$ null direction that is in a $j^{th}$ position in the $e_{n_{estimated}}$ vector.

As shown by reference number 116, the testing device may determine error correction information (e.g., based on the error information) associated with the plurality of null directions. For example, the testing device may inverse the $e_{n_{estimated}}$ vector to generate a $c_{n_{estimated}}$ vector (e.g., where $$c_{n_{estimated}} = (e_{n_{estimated}})^{-1}),$$

In this way, each estimated error correction value, of the plurality of estimated error correction values of the $c_{n_{estimated}}$ vector, may be (or may be based on) an inverse of a corresponding estimated error value of the plurality of estimated error values of the $e_{n_{estimated}}$ vector. Accordingly, in some implementations, $$c_{n_{estimated}} = \begin{bmatrix} 1 \\ \vdots \\ c_{n_{estimated}(j)} \\ \vdots \\ c_{n_{estimated}(N)} \end{bmatrix},$$

where a 1 is in a first position of the $c_{n_{estimated}}$ vector, and $c_{n_{estimated}(j)}$ is an estimated error correction value associated with the $j^{th}$ null direction (e.g., that is equal to $1/e_{n_{estimated}}$ that is in a $j^{th}$ position in the $c_{n_{estimated}}$ vector.

As shown by reference number 118, the testing device may provide the error correction information (e.g., that includes the $c_{n_{estimated}}$ vector), such as to the PSM. For example, the testing device may send the error correction information to the PSM via at least one of the plurality of output cables, or via a different connection (e.g., a different cable, or another wired or wireless communication link) between the testing device and the PSM.

As shown by reference number 120, the PSM may use the possible error correction information to adjust the one or more settings of the PSM, such as to address the plurality of estimated error values (e.g., as indicated by the $e_{n_{estimated}}$ vector of the error information) that are respectively associated with the plurality of null directions. For example, the PSM may process (e.g., parse, read, and/or analyze) the error correction information to identify the plurality of estimated error correction values (e.g., as indicated by the $c_{n_{estimated}}$ vector of the error correction information). The PSM may therefore adjust the one or more settings of the PSM based on the plurality of estimated error correction values to address the plurality of estimated error values.

In this way, the PSM may use the error correction information to calibrate the PSM, which minimizes an amount of signal (e.g., noise) associated with each of the plurality of null directions. This thereby facilitates more accurate testing of the base station by the PSM and/or the testing device (e.g., after the PSM is calibrated using the error correction information).

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
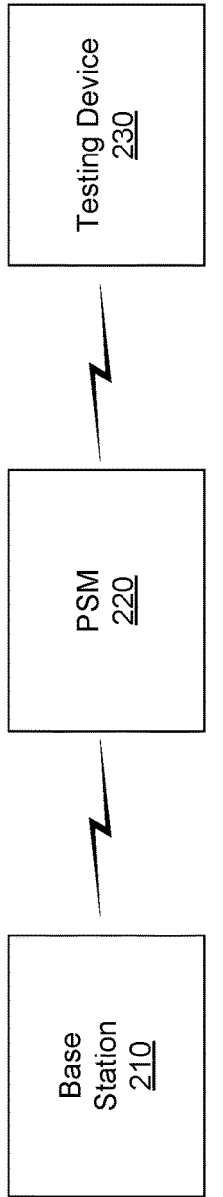
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a base station 210, a PSM 220, and a testing device 230. Devices of environment 200 may interconnect via wired connections, wireless connections, or a combination of wired and wireless connections.

Base station 210 includes one or more devices capable of communicating with a UE using a cellular radio access technology (RAT). For example, base station 210 may include a base transceiver station, a radio base station, a node B, an evolved node B (eNB), a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. Base station 210 may transfer traffic between a UE (e.g., using a cellular RAT), other base stations 210 (e.g., using a wireless interface or a backhaul interface, such as a wired backhaul interface). Base station 210 may provide one or more cells that cover geographic areas. Some base stations 210 may be mobile base stations. Some base stations 210 may be capable of communicating using multiple RATs.

In some implementations, base station 210 may perform scheduling and/or resource management for UEs covered by base station 210 (e.g., UEs covered by a cell provided by base station 210). In some implementations, base stations 210 may be controlled or coordinated by a network controller, which may perform load balancing, network-level configuration, and/or the like. The network controller may communicate with base stations 210 via a wireless or wireline backhaul. In some implementations, base station 210 may include a network controller, a self-organizing network (SON) module or component, or a similar module or component. In other words, a base station 210 may perform network control, scheduling, and/or network management functions (e.g., for other base stations 210 and/or for uplink, downlink, and/or sidelink communications of UEs covered by the base station 210). In some implementations, base station 210 may include a central unit and multiple distributed units. The central unit may coordinate access control and communication with regard to the multiple distributed units. The multiple distributed units may provide UEs and/or other base stations 210 with access to a network.

In some implementations, base station 210 may be capable of M-MIMO communication (e.g., beamformed communication). In a testing scenario, one or more antenna elements (e.g., an antenna array) of base station 210 may be disconnected, and base station 210 may be connected the PSM 220 via one or more antenna ports of base station 210, as described elsewhere herein.

PSM 220 includes one or more devices capable emulating spatial aspects of signals transmitted by base station 210. PSM 220 may include a plurality of input ports that allow PSM to connect to base station 210 (e.g., via a plurality of input cables). PSM 220 may include a plurality of output ports that allow PSM 220 to connect to testing device 230 (e.g., via a plurality of output cables). PSM 220 may communicate with testing device 230 to allow PSM 220 to be calibrated, as described herein.

Testing device 230 includes one or more devices capable of communicating with base station 210 and/or a PSM 220, such as to perform processing of a signal pattern produced by base station 210. Testing device 230 may communicate with base station 210 and/or PSM 220 by a wired connection, as described elsewhere herein. In some implementations, testing device 230 may wirelessly communicate with base station 210 and/or PSM 220.

Testing device 230 may include one or more devices capable of receiving, generating, storing, processing, and/or providing information associated with a signal pattern. For example, the test component may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

The quantity and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
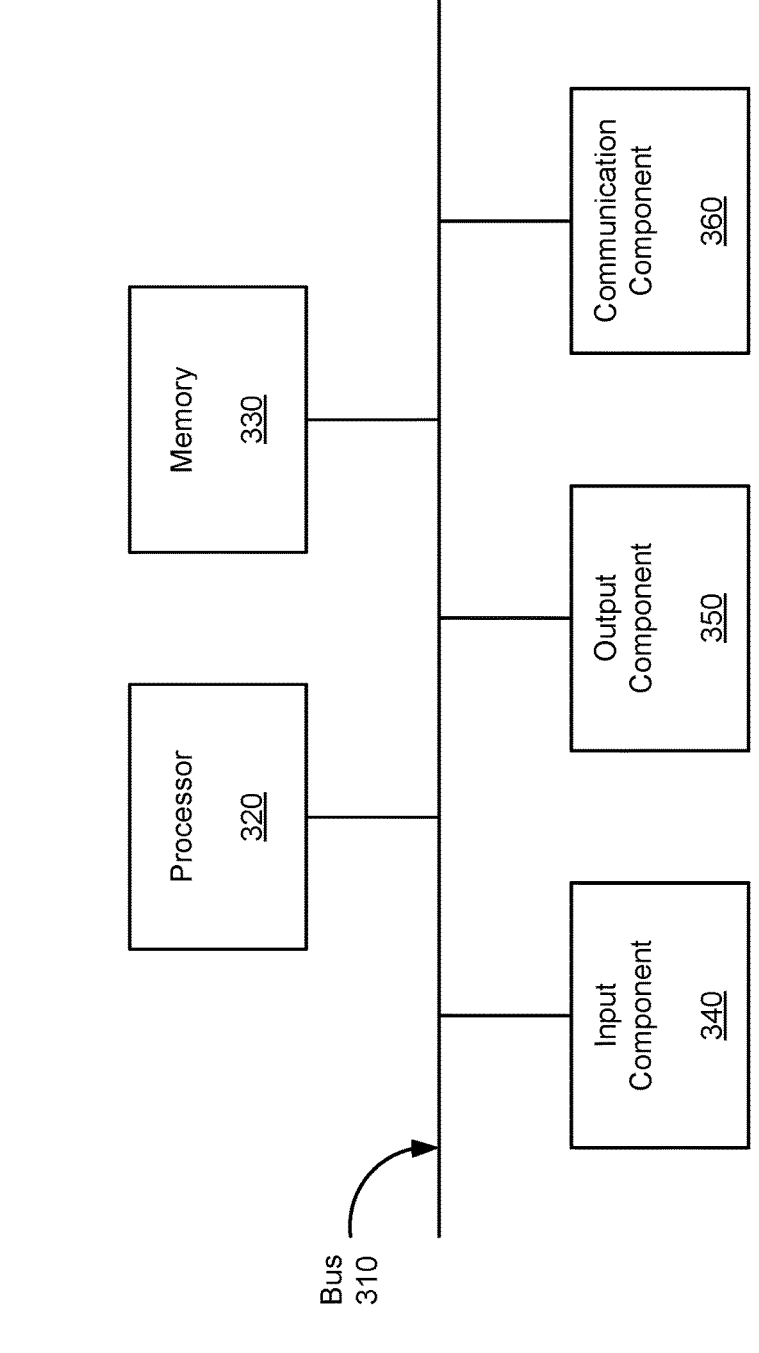
FIG. 3 is a diagram of example components of a device associated with calibration of a PSM for cable-connected testing of a M-MIMO base station.

FIG. 3 is a diagram of example components of a device 300 associated with calibration of a PSM for cable-connected testing of a M-MIMO base station. The device 300 may correspond to base station 210, PSM 220, and/or testing device 230. In some implementations, base station 210, PSM 220, and/or testing device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
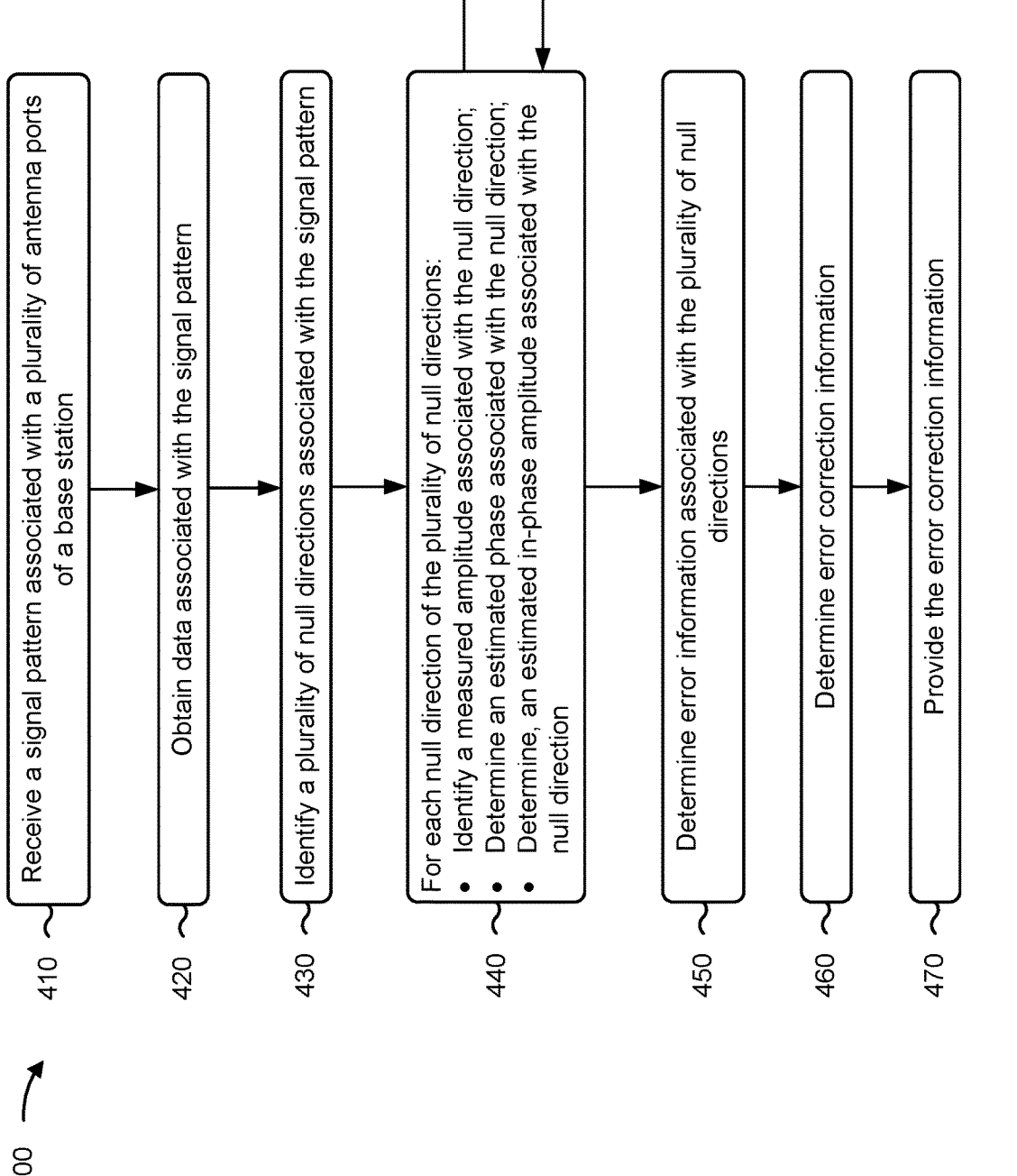
FIG. 4 is a flowchart of an example process associated with calibration of a PSM for cable-connected testing of a M-MIMO base station.

FIG. 4 is a flowchart of an example process 400 associated with calibration of a PSM for cable-connected testing of a M-MIMO base station. In some implementations, one or more process blocks of FIG. 4 are performed by a testing device (e.g., testing device 230). In some implementations, one or more process blocks of FIG. 4 are performed by another device or a group of devices separate from or including the testing device, such as a base station (e.g., base station 210) and/or a PSM (e.g., PSM 220). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving a signal pattern associated with a plurality of antenna ports of a base station (block 410). For example, the testing device may receive, from a PSM, a signal pattern associated with a plurality of antenna ports of a base station, as described above.

As further shown in FIG. 4, process 400 may include obtaining data associated with the signal pattern (block 420). For example, the testing device may obtain data associated with the signal pattern, as described above.

As further shown in FIG. 4, process 400 may include identifying a plurality of null directions associated with the signal pattern (block 430). For example, the testing device may identify, based on the data, a plurality of null directions associated with the signal pattern, as described above.

As further shown in FIG. 4, process 400 may include, for each null direction of the plurality of null directions: identifying a measured amplitude associated with the null direction, determining an estimated phase associated with the null direction, and determining an estimated in-phase amplitude associated with the null direction (block 440). For example, the testing device may, for each null direction of the plurality of null directions: identify, based on the data, a measured amplitude associated with the null direction; determine, based on the measured amplitude, an estimated phase associated with the null direction; and determine, based on the measured amplitude and the estimated phase, an estimated in-phase amplitude associated with the null direction, as described above. As further shown in FIG. 4, the testing device may iteratively perform the operations associated with block 440 to determine the estimated in-phase amplitude associated each null direction of the plurality of null directions.

As further shown in FIG. 4, process 400 may include determining error information associated with the plurality of null directions (block 450). For example, the testing device may determine, based on the estimated in-phase amplitude associated with each null direction of the plurality of null directions, error information associated with the plurality of null directions, as described above.

As further shown in FIG. 4, process 400 may include determining error correction information (block 460). For example, the testing device may determine, based on the error information, error correction information, as described above.

As further shown in FIG. 4, process 400 may include providing the error correction information (block 470). For example, the testing device may provide the error correction information, as described above.

Process 400 may include additional implementations, such as any single implementation or any combination of implementations described below and/or in connection with one or more other processes described elsewhere herein.

In a first implementation, providing the error correction information allows the PSM to be calibrated using the error correction information.

In a second implementation, alone or in combination with the first implementation, the PSM is a variable PSM.

In a third implementation, alone or in combination with one or more of the first and second implementations, determining the estimated phase associated with the null direction comprises determining, based on the measured amplitude and a first phase value, a first possible amplitude associated with the null direction; determining, based on the first possible amplitude, first possible error information; determining, based on the first possible error information, first possible error correction information; providing the first possible error correction information, identifying, based on providing the first possible error correction information, a first other measured amplitude associated with the null direction; determining, based on the measured amplitude and a second phase value, a second possible amplitude associated with the null direction; determining, based on the second possible amplitude, second possible error information; determining, based on the second possible error information, second possible error correction information; providing the second possible error correction information; identifying, based on providing the second possible error correction information, a second other measured amplitude associated with the null direction; determining, based on the measured amplitude and a third phase value, a third possible amplitude associated with the null direction; determining, based on the third possible amplitude, third possible error information; determining, based on the third possible error information, third possible error correction information; providing the third possible error correction information; identifying, based on providing the third possible error correction information, a third other measured amplitude associated with the null direction; and processing the first other measured amplitude, the second other measured amplitude, and the third other measured amplitude to determine the estimated phase associated with the null direction.

In a fourth implementation, alone or in combination with one or more of the first through third implementations, processing the first other measured amplitude, the second other measured amplitude, and the third other measured amplitude comprises processing the first other measured amplitude, the second other measured amplitude, and the third other measured amplitude to determine the estimated phase associated with the null direction according to a formula $$\psi = \text{atan } 2(k2-b, k1-b) - \pi,$$

wherein $\psi$ is the estimated phase, atan2 is a four quadrant arctangent function, k1 is the first other measured amplitude, k2 is the second other measured amplitude, k3 is the third other measured amplitude, and $$b = (k2+k3)/2.$$

In a fifth implementation, alone or in combination with one or more of the first through fourth implementations, the error information includes a first vector that includes a plurality of estimated error values respectively associated with the plurality of null directions, and wherein the error correction information includes a second vector that includes a plurality of estimated error correction values respectively associated with the plurality of null directions.

In a sixth implementation, alone or in combination with one or more of the first through fifth implementations, each estimated error correction value, of the plurality of estimated error correction values of the second vector, is based on an inverse of a corresponding estimated error value of the plurality of estimated error values of the first vector.

In a seventh implementation, alone or in combination with one or more of the first through sixth implementations, the plurality of antenna ports of the base station are arranged in a two-dimensional pattern.

In an eighth implementation, alone or in combination with one or more of the first through seventh implementations, determining the estimated phase associated with the null direction includes using a dithering technique.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. A method, comprising:
receiving, by a testing device and from a phase shift matrix (PSM), a signal pattern associated with a plurality of antenna ports of a base station;
obtaining, by the testing device, data associated with the signal pattern;
identifying, by the testing device and based on the data, a plurality of null directions associated with the signal pattern;
for each null direction of the plurality of null directions:

identifying, by the testing device and based on the data, a measured amplitude associated with the null direction, determining, by the testing device and based on the measured amplitude, an estimated phase associated with the null direction, and determining, based on the measured amplitude and the estimated phase, an estimated in-phase amplitude associated with the null direction;

determining, by the testing device and based on the estimated in-phase amplitude associated with each null direction of the plurality of null directions, error information associated with the plurality of null directions;

determining, based on the error information, error correction information; and providing the error correction information.

2. The method of claim 1, wherein providing the error correction information allows the PSM to be calibrated using the error correction information.

3. The method of claim 2, wherein the PSM is at least one of:

a variable PSM;

a fixed PSM;

an analog PSM;

a digital PSM.

4. The method of claim 1, wherein determining the estimated phase associated with the null direction comprises:

determining, based on the measured amplitude and a first phase value, a first possible amplitude associated with the null direction;

determining, based on the first possible amplitude, first possible error information;

determining, based on the first possible error information, first possible error correction information;

providing the first possible error correction information;

identifying, based on providing the first possible error correction information, a first other measured amplitude associated with the null direction;

determining, based on the measured amplitude and a second phase value, a second possible amplitude associated with the null direction;

determining, based on the second possible amplitude, second possible error information;

determining, based on the second possible error information, second possible error correction information;

providing the second possible error correction information;

identifying, based on providing the second possible error correction information, a second other measured amplitude associated with the null direction;

determining, based on the measured amplitude and a third phase value, a third possible amplitude associated with the null direction;

determining, based on the third possible amplitude, third possible error information;

determining, based on the third possible error information, third possible error correction information;

providing the third possible error correction information;

identifying, based on providing the third possible error correction information, a third other measured amplitude associated with the null direction; and processing the first other measured amplitude, the second other measured amplitude, and the third other measured amplitude to determine the estimated phase associated with the null direction.

5. The method of claim 4, wherein processing the first other measured amplitude, the second other measured amplitude, and the third other measured amplitude comprises:

processing the first other measured amplitude, the second other measured amplitude, and the third other measured amplitude to determine the estimated phase associated with the null direction according to a formula:

$$\psi = \text{atan } 2(k2-b, k1-b) - \pi,$$

wherein $\psi$ is the estimated phase, atan2 is a four quadrant arctangent function, k1 is the first other measured amplitude, k2 is the second other measured amplitude, k3 is the third other measured amplitude, and $$b = (k2+k3)/2.$$

6. The method of claim 1, wherein determining the estimated phase associated with the null direction includes using a dithering technique.

7. The method of claim 1, wherein the error information includes a first vector that includes a plurality of estimated error values respectively associated with the plurality of null directions, and wherein the error correction information includes a second vector that includes a plurality of estimated error correction values respectively associated with the plurality of null directions.

8. The method of claim 7, wherein each estimated error correction value, of the plurality of estimated error correction values of the second vector, is based on an inverse of a corresponding estimated error value of the plurality of estimated error values of the first vector.

9. The method of claim 1, wherein the plurality of antenna ports of the base station are arranged in a two-dimensional pattern.

10. A testing device, comprising:

one or more memories; and one or more processors, coupled to the one or more memories, configured to:

obtain data associated with a signal pattern of a plurality of antenna ports of a base station;

identify, based on the data, a plurality of null directions associated with the signal pattern;

for each null direction of the plurality of null directions:

determine, based on a measured amplitude associated with the null direction, an estimated phase associated with the null direction, and determine, based on the measured amplitude and the estimated phase, an estimated in-phase amplitude associated with the null direction;

determine, based on the estimated in-phase amplitude associated with each null direction of the plurality of null directions, error correction information associated with the plurality of null directions; and provide the error correction information.

11. The testing device of claim 10, wherein providing the error correction information allows at least one of:

one or more settings a phase shift matrix (PSM) to be adjusted, one or more settings of a base station to be adjusted, or one or more settings of one or more control blocks to be adjusted.

12. The testing device of claim 10, wherein the one or more processors, to determine the estimated phase associated with the null direction, are configured to:

identify, based on providing first possible error correction information, a first other measured amplitude associated with the null direction;

identify, based on providing second possible error correction information, a second other measured amplitude associated with the null direction;

identify, based on providing third possible error correction information, a third other measured amplitude associated with the null direction; and process the first other measured amplitude, the second other measured amplitude, and the third other measured amplitude to determine the estimated phase associated with the null direction.

13. The testing device of claim 10, wherein the error correction information includes a plurality of estimated error correction values respectively associated with the plurality of null directions.

14. The testing device of claim 13, wherein each estimated error correction value, of the plurality of estimated error correction values of the error correction information, is based on a corresponding estimated error value associated with a null direction of the plurality of null directions.

15. The testing device of claim 10, wherein the plurality of antenna ports of the base station are arranged in a two-dimensional pattern.

16. A non-transitory computer-readable medium storing a set of instructions, the set of instructions comprising:

one or more instructions that, when executed by one or more processors of a testing device, cause the testing device to:

identify, based on data associated with a signal pattern of a plurality of antenna ports of a base station, a plurality of null directions associated with the signal pattern;

determine, based on the data, estimated in-phase amplitudes respectively associated with the plurality of null directions;

determine, based on the estimated in-phase amplitudes respectively associated with the plurality of null directions, error correction information associated with the plurality of antenna ports of the base station; and provide the error correction information.

17. The non-transitory computer-readable medium of claim 16, wherein providing the error correction information allows a phase shift matrix (PSM) to be calibrated using the error correction information.

18. The non-transitory computer-readable medium of claim 16, wherein the one or more instructions, that cause the testing device to determine the estimated in-phase amplitudes respectively associated with the plurality of null directions, cause the testing device to:

determine, based on the data, and by using a phase sweeping technique, estimated phases respectively associated with the plurality of null directions; and determine, based on the estimated phases respectively associated with the plurality of null directions, the estimated in-phase amplitudes respectively associated with the plurality of null directions.

19. The non-transitory computer-readable medium of claim 16, wherein the one or more instructions, that cause the testing device to determine the estimated in-phase amplitudes respectively associated with the plurality of null directions, cause the testing device to:

determine, based on the data, and by using a phase sampling technique, estimated phases respectively associated with the plurality of null directions; and determine, based on the estimated phases respectively associated with the plurality of null directions, the estimated in-phase amplitudes respectively associated with the plurality of null directions.

20. The non-transitory computer-readable medium of claim 16, wherein the plurality of antenna ports of the base station are arranged in a two-dimensional pattern.

* * * * *